United States Patent [19]

Hamameh et al.

[11] Patent Number: 5,864,660
[45] Date of Patent: Jan. 26, 1999

[54] TESTING THE INTEGRATION OF A PLURALITY OF ELEMENTS IN A COMPUTER SYSTEM USING A PLURALITY OF TESTS CODES, EACH CORRESPONDING TO AN ALTERNATE PRODUCT CONFIGURATION FOR AN ASSOCIATED ELEMENT

[75] Inventors: Imad W. Hamameh, Carrollton; Reinier J. Aerdts, Plano; Martin R. Brack, Garland, all of Tex.

[73] Assignee: Electronic Data Systems Corporation, Plano, Tex.

[21] Appl. No.: 975,394

[22] Filed: Nov. 20, 1997

Related U.S. Application Data

[63] Continuation of Ser. No. 614,222, Mar. 12, 1996, abandoned.

[51] Int. Cl.$^6$ .................................................. G06F 11/00
[52] U.S. Cl. ............................ 395/183.098; 395/183.03; 395/183.16
[58] Field of Search ..................... 395/183.03, 183.08, 395/183.09, 183.14, 183.13, 183.16, 682, 680; 707/203

[56] References Cited

U.S. PATENT DOCUMENTS

| | | | |
|---|---|---|---|
| 4,489,414 | 12/1984 | Titherley | 395/183.16 |
| 4,639,916 | 1/1987 | Boutterin et al. | 395/183.03 |
| 4,888,771 | 12/1989 | Benignus et al. | 195/183.02 |
| 5,371,883 | 12/1994 | Gross et al. | 395/183.14 |
| 5,410,681 | 4/1995 | Jessen et al. | 395/500 |
| 5,428,619 | 6/1995 | Scwatrz et al. | 395/185.01 |
| 5,499,357 | 3/1996 | Sonty et al. | 395/500 |
| 5,542,043 | 7/1996 | Cohen et al. | 395/183.08 |
| 5,546,595 | 8/1996 | Norman et al. | 395/500 |
| 5,557,740 | 9/1996 | Johnson et al. | 395/183.16 |
| 5,579,509 | 11/1996 | Furtney et al. | 395/500 |
| 5,615,333 | 3/1997 | Juenttner et al. | 395/183.14 |
| 5,651,111 | 7/1997 | McKeeman et al. | 395/183.14 |

OTHER PUBLICATIONS

Hess "A Component Oriented Environment For Systems Development", IEEE Digital Avionics Systems conf., pp. 383–388, 1995.

Primary Examiner—Joseph E. Palys
Attorney, Agent, or Firm—L. Joy Griebenow

[57] ABSTRACT

A computing system (10) includes elements (12–24) interfacing at integration points (26–47). One or more of the elements (12–24) may be associated with one or more testing tables. For example, a testing table (48) may include a test procedure (54) and several corresponding test codes (54a, 54b, 54c) associated with alternate product configurations (12a, 12b, 12c) that satisfy the functional requirements of an element (12). The testing tables in the computing system (10) provide a systematic and standardized scheme for defining, creating, modifying, and adapting integration test code. A testing system (11) accesses the testing tables to test the integration of the elements (12–24) in the computing system (10).

10 Claims, 5 Drawing Sheets

TESTING THE INTEGRATION OF A PLURALITY OF ELEMENTS IN A COMPUTER SYSTEM USING A PLURALITY OF TESTS CODES, EACH CORRESPONDING TO AN ALTERNATE PRODUCT CONFIGURATION FOR AN ASSOCIATED ELEMENT

This application is a continuation of application Ser. No. 08/614,222, filed Mar. 12, 1996, now abandoned.

TECHNICAL FIELD OF THE INVENTION

This invention relates in general to the field of computing systems, and more specifically to integration testing in computing systems.

BACKGROUND OF THE INVENTION

Computing systems may include a variety of hardware and software products available from various suppliers. Often products made by a single supplier integrate or interoperate effectively in a computing system. However, integration difficulties may arise in computing systems that include products from different suppliers.

The problem of integrating a variety of hardware and software products from different suppliers becomes increasingly challenging with larger and more complex computing systems. Moreover, as more suppliers enter the market with new computing system products, the problems of integration increase further. More specifically, even if some of the products used to implement a computing system can be integrated with each other, the computing system may still fail to operate properly if other products in the system cannot be integrated. Consequently, each time that a computing system is implemented with products from various suppliers, testing must usually be performed to ensure the integration of all products in the system.

SUMMARY OF THE INVENTION

In accordance with the present invention, the disadvantages and problems associated with implementing a computing system have been substantially reduced or eliminated.

In accordance with one embodiment of the present invention, a method for testing integration of an element in a computing system includes: retrieving a testing table for the element; identifying an alternate product configuration for the element; retrieving from the testing table a test code corresponding to the alternate product configuration; and executing the test code to test integration of the element in the computing system.

In accordance with another embodiment of the present invention, a computing system includes a first element. A second element couples with the first element at an integration point. A testing table has a plurality of test codes operable to test integration of the first element and the second element at the integration point, each test code corresponding to a product configuration of the first element.

In accordance with yet another embodiment of the present invention, a computing system includes a plurality of elements coupled at one or more first integration points. At least one first testing table can be used to test integration of the elements at the first integration points. An additional element couples to the elements at one or more second integration points. At least one second testing table can be used to test integration of the additional element with the elements at the second integration points.

A particular advantage of the present invention is a systematic and standardized scheme for defining integration or interoperability between components in a computing system using integration points. The integration points represent communication, coupling, interchange, exchange, or dependence between two or more components. An integration point may relate to commands passed between components (e.g., load, store, retrieve, search, shut down, reboot, import, export, restore, etc.), communications between elements (e.g., receive data, send data, establish connection, format disk, format tape, create file, etc.), or any other type of interface between two or more components.

Another technical advantage of the present invention includes providing a computing system having a variety of hardware and software components that have been integration tested. In one embodiment, this is accomplished by defining the integration points between components, generating test codes for testing interoperability at the defined integration points, combining one or more of the test codes into a testing program, and executing the test program to test integration of the components.

Yet another technical advantage of the present invention includes identifying one or more groups of alternate product configurations that may be used to implement a specific component in an integrated computing system. One or more test codes, corresponding to each alternate product configuration, may be stored in a testing table associated with the specific component. When a particular product configuration is used to implement the component, the corresponding test codes are retrieved from the testing table. The retrieved test codes can be used to test integration of the particular product configuration in the computing system.

In a specific embodiment, the testing table includes a test procedure that functionally represents an integration test for a specific component. The test procedure may be used to define or outline a generic test structure to facilitate generation of specific test code for each alternate product configuration. Generally, the generation, maintenance, and storage of testing tables, according to the present invention, provides a convenient and logical technique to develop and organize integration test code.

Yet another important technical advantage of the present invention includes providing modular (i.e., self-contained) testing tables and test codes for components in a computing system. In one embodiment, the operability of any one testing table or test code preferably does not depend on the operability or presence of any other testing table or test code. Thus, when testing tables/test codes are either added or removed, the original or remaining tables/codes are still operable to test integration of the corresponding components.

Yet another important technical advantage of the present invention is providing an integrated computing system which includes a number of functionally defined elements and sub-elements. In particular, each element or sub-element of the computing system preferably performs a specific function, such as processing information, storing information, controlling another element, interacting with another computing system, interacting with a user, receiving information, or any other function which can be performed in a computing system. Each element or sub-element functionality may be satisfied by one or more hardware or software components in the computing system, and the integration of each element and sub-element may be performed using testing tables as described above. Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
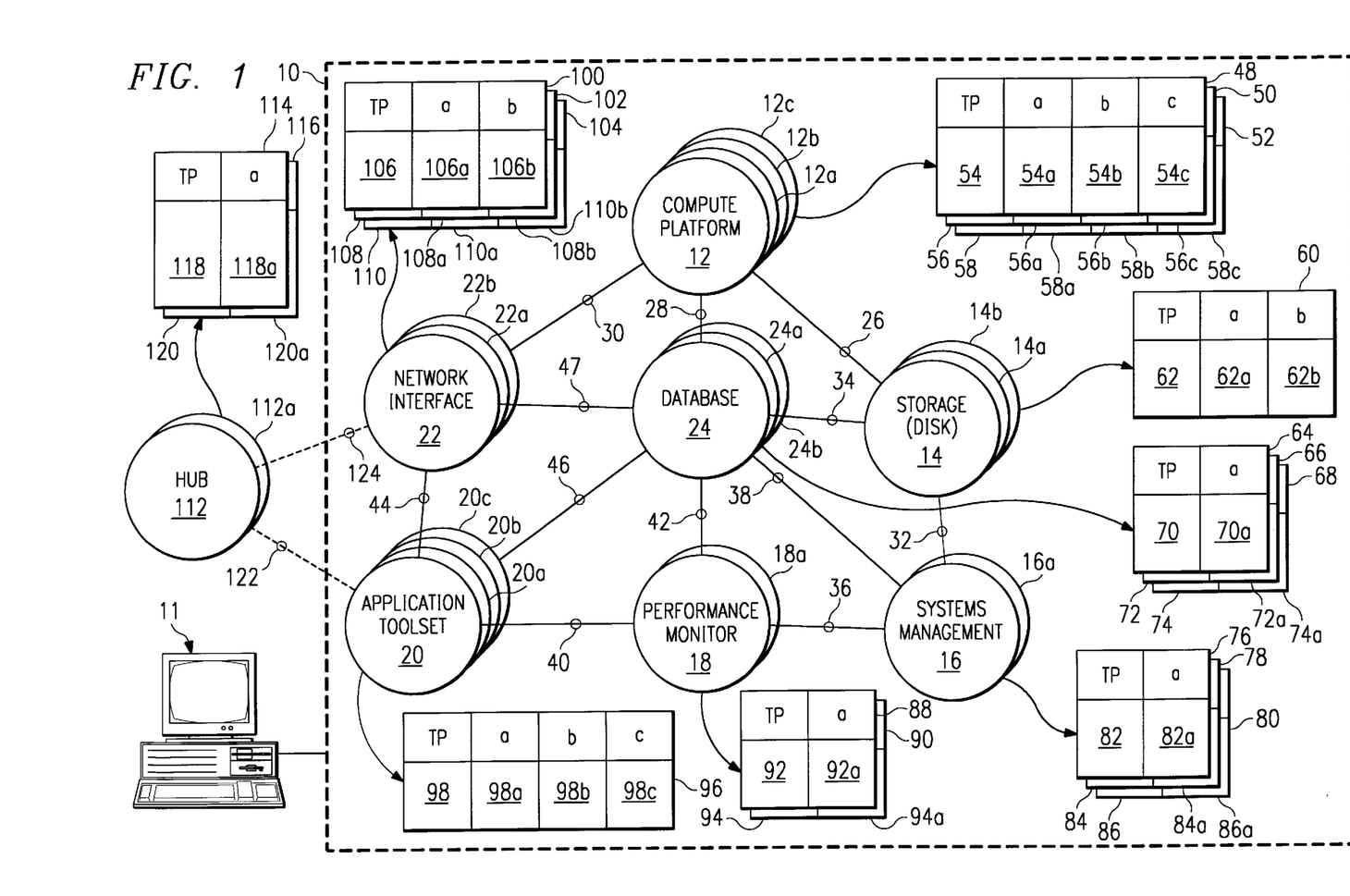
FIG. 1 illustrates a computing system implemented from a variety of hardware and software elements.

FIG. 1 illustrates a computing system 10 coupled with a testing system 11. Computing system 10 includes a plurality of hardware and software elements that interoperate to manipulate, process, communicate, or store information. For example, as shown in FIG. 1, computing system 10 may comprise a compute platform 12, a disk storage device 14, a systems management 16, a performance monitor 18, an application toolset 20, a network interface 22, and a database 24. It must be understood, however, that in other embodiments, computing system 10 may comprise only a portion of the previously listed elements and/or other suitable elements that offer additional functionability to computing system 10.

Each of the elements (both software and hardware) in computing system 10 serves a particular function within the system. For example, compute platform 12 may serve primarily to receive and process information input into computing system 10. Similarly, database 24 may function primarily to store data received by, and/or generated within, computing system 10.

Because the elements are preferably defined by function, each element may be implemented as one or more alternate product configurations that can be used to perform the specified function. For any particular embodiment of computing system 10, typically one alternate product configuration will be used to implement a specific element. For example, compute platform 12 may be implemented as a SPARCServer manufactured by Sun Microsystems, Inc. running the Solaris operations environment; an HP-9000 manufactured by Hewlett-Packard Corp. running the HP-UX operations environment; or a SYMMETRY-5000 manufactured by Sequent Computer Systems, Inc. running the DYNIX/ptx operations environment or any other suitable computing platform. These alternate product configurations are designated by reference numerals 12a, 12b, and 12c, respectively, in FIG. 1. It should be understood that the present invention contemplates any number of alternate product configurations for any element in computing system 10.

Similarly, disk storage device 14 may be implemented using CLARiiON supplied by Memorex (14a), OPEN SYMMETRIX supplied by EMC$^2$ (14b), or any other suitable disk storage product. Systems management 16 may be implemented using CA-UNICENTER supplied by Computer Associates International, Inc. (16a), or any other suitable systems management product. Performance monitor 18 may be implemented using PATROL supplied by BMC Software (18a), or any other suitable performance monitor product. Also application toolset 20 may be implemented using a variety of the COMPOSER by IEF products supplied by Texas Instruments (20a, 20b, 20c), or any other suitable application toolset product.

As another example, network interface 22 can be implemented as an Ethernet network interface card (NIC), a fiber distributed data interface (FDDI) NIC, designated by reference numerals 22a and 22b, respectively, or any other suitable interface hardware or software product. Also, database 24 may be implemented using an Oracle database (24a), a Sybase database (24b), or any other suitable database product.

All elements shown in computing system 10 may include one or more alternate product configurations. Furthermore, for each element, the number of products in alternate product configurations may differ. Thus, one product configuration of an element may consist of three distinct products, while another product configuration of the same element may consist of only one product. The number and selection of elements and supported alternate product configurations may depend on any of a variety of factors, such as the operating environment, the desired functionality of the elements, the available products to satisfy the desired functionality of the elements, or the overall requirements of computing system 10.

Each hardware and software element in computing system 10 interfaces with at least one other element at one or more integration points. As an illustrative example, database 24 interfaces with compute platform 12, disk storage device 14, systems management 16, performance monitor 18, application toolset 20, and network interface 22 at integration points 28, 34, 38, 42, 46, and 47, respectively. Similarly, compute platform 12 may interface with disk storage device 14, database 24, and network interface 22 at integration points 26, 28, and 30, respectively. Likewise, disk storage device 14 interfaces with compute platform 12, systems management 16, and database 24 at integration points 26, 32, and 34, respectively. As another example, systems management 16 interfaces with disk storage device 14, performance monitor 18, and database 24 at integration points 32, 36, and 38, respectively. Also, performance monitor 18 interfaces with systems management 16, application toolset 20, and database 24 at integration points 36, 40, and 42, respectively. Application toolset 20 may inteface with performance monitor 18, network interface 22, and database 24 at integration points 40, 44, and 46, respectively. In addition, network interface 22 interfaces with applicaton toolset 20, compute platform 12, and database 24 at integration points 44, 30, and 47, respectively.

The present invention provides a systematic and standardized scheme for defining integration or interoperability between elements in computing system 10 using integration points. Generally, an integration point represents any communication, coupling, interchange, exchange, or dependence between two elements in computing system 10. An integration point may relate to commands passed between two elements (e.g., load, store, retrieve, search, shut down, reboot, import, export, restore, etc.), communications between two elements (e.g., receive data, send data, establish connection, format disk, format tape, create file, etc.), or any other type of interface between two or more elements.

For illustration, integration point 38 can represent the performance of one or more functionality tests between database 24 and systems management 16 to test, for example, a back-up, import, export, restore, copy, or monitor functionality. Similarly, integration point 28 can represent the performance of one or more server functionality tests between database 24 and compute platform 12 to test, for example, query tools, reporting tools, or precompilers.

In one embodiment, the integration points in computing system 10 may be identified based on the functions provided by elements in computing system 10. Alternatively, the integration points in computing system 10 can be identified based on the product configurations in computing system 10, the products in each product configuration, the interfaces available on a product, and/or a product's use in computing system 10. Furthermore, the integration points can be identified by manual inspection of the products and/or product configurations.

Although FIG. 1 shows specific integration points between particular elements, it must be understood that the present invention contemplates that each element may interface with as few as one or as many as all of the other elements in computing system 10. Furthermore, although not shown for the sake of clarity in FIG. 1, more than one integration point may exist between any two particular elements.

Each element in computing system 10 may be associated with one or more testing tables. For example, testing tables 48, 50, and 52, are associated with compute platform 12. Likewise, testing tables 76, 78, and 80 are associated with systems management 16. Computing system 10 need not include testing tables for each element. Generally one or more testing tables associated with one or more elements may be used to test the integration of computing system 10. It should be understood that according to the present invention the testing tables generally represent any informational organization or structure in volatile memory, nonvolatile memory, disk storage, tape storage, or any other suitable storage medium that associates test codes and/or test procedures with corresponding elements and alternate product configurations in computing system 10 (as explained below in more detail). The testing tables can reside on the suitable storage media and be set aside to be filled with test codes and/or test procedures as appropriate.

Each testing table may include a test procedure, which generally represents an integration test for the associated element at one or more integration points. The test procedures may be steps, commands, pseudocode, or any other format of information that defines, outlines, or represents a test for the commands, functions, transfers, or other activity between two or more elements in computing system 10. The test procedure may be used to define or outline a generic test structure to facilitate generation of specific test code for each alternate product configuration. It should be understood that testing tables in computing system 10 may or may not include test procedures.

The testing procedures, however, are not actually used to test integration of the elements in computing system 10. Rather, integration is tested by one or more test codes, which correspond to alternate product configurations for each element. Each test code typically follows the steps or commands outlined by an associated test procedure but is specific to a particular product configuration. A test code comprises commands, procedures, data, or other information that is properly formatted for its corresponding product configuration so that the configuration can be integration tested in computing system 10. These test codes may also be included in the testing tables along with the associated test procedures.

For example, testing table 48 includes a test procedure 54 which may define a generic test structure for testing integration of compute platform 12 at integration point 26. Testing tables 50 and 52 may define a generic test structure for testing integration of compute platform 12 at integration points 28 and 30, respectively. Depending on the desired modularity and organization of integration test code, each testing table in computing system 10 may be associated with the integration testing of one or more integration points.

Test procedure 54 for integration point 26 may comprise one or more instructions, steps, or commands such as "load," "save," "store," "retrieve," or any other instruction or step representing interaction between compute platform 12 and disk storage device 14. Testing table 48 also includes test codes 54a, 54b, and 54c, which correspond to alternate product configurations, such as SPARCServer/Solaris configuration 12a, HP9000/HPUX configuration 12b, and SYMMETRY 5000/DYNIX/ptx configuration 12c, among other possible product configurations. As an illustrative example, test code 54a might follow the general steps or instructions of test procedure 54 but comprise commands, procedures, data, or other information specifically formatted for SPARCServer/Solaris configuration 12a, such as "LOAD_D1," "SAVE_D1," "STORE_D1," or "RETRIEVE_D1."

The testing tables for each element in computing system 10 can reside within the corresponding element, within one or more other elements in the computing system (e.g., database 24), or within testing system 11. Integration testing of any combination of elements in computing system 10 can be performed by combining the corresponding testing tables. Because the testing tables and test codes may be modular (i.e., self-contained), in accordance with the present invention, if testing tables are associated with integration points, testing system 11 may easily adapt to the removal or addition of an element or integration point by selecting the appropriate testing tables. Thus, new testing tables and/or test codes do not necessarily need to be created each time a change is made to computing system 10.

Testing system 11 is coupled to computing system 10 and may be implemented as a workstation, a file server, a database, one or more software programs, and/or any other configuration of software and hardware components distinct from computing system 10. Alternatively, testing system 11 may be contained within or integral to one or more of the elements in computing system 10. For example, testing system 11 may be implemented, in whole or in part, on compute platform 12, database 24, systems management 16, or any other appropriate element in computing system 10. Also, testing system 11 may be partially integrated into elements in computing system 10 and partially residing in hardware and software components distinct from computing system 10.

Testing system 11 generates and stores testing tables and test codes for each element of computing system 10. Testing system 11 then executes the test codes to test, at the integration points, the integration of corresponding elements within computing system 10. Furthermore, testing system 11 may generate, store, and execute additional testing tables to test the integration of any additional elements, such as a hub 112, that may be added to computing system 10.

In operation, based on the functional requirements for an embodiment of computing system 10, a plurality of hardware and software elements are selected. Each element, defined by the function which it performs, can be implemented as any one or more product configurations selected from the group of alternate product configurations operable to perform that function. The product configurations comprise one or more products used to perform the function of the corresponding element. Each product configuration may have one or more functionally defined sub-elements which can be implemented as any one of a plurality of alternate products in the product configuration. Consequently, a technical advantage of the present invention is the flexibility to choose alternate products for each element depending on a variety of factors such as, for example, performance and storage requirements, specific tasks to be performed, physical computing environment, economic restrictions, pricing considerations, servicing demands, the availability of products, and other suitable considerations.

Testing system 11 defines the integration points between elements in computing system 10. Each integration point preferably represents communication, coupling, interchange, exchange, or dependence between two or more elements. A particular advantage of the present invention is a systematic and standardized scheme for defining integration or interoperability between the elements in computing system 10 using the identified integration points. More specifically, one or more testing tables are associated with each element and/or integration point in computing system 10. Each testing table may include a test procedure generally representing an integration test for the element and at least one test code corresponding to a particular product configuration for the element. The test codes test interoperability at the identified integration points for each corresponding element. The generation, maintenance, and storage of testing tables provides a convenient and logical technique to organize integration test code.

For each particular product configuration used to implement an element in computing system 10, the corresponding test codes are retrieved from the testing tables associated with that element. Testing system 11 can combine appropriate retrieved test codes into a testing program. Because of the modularity of the test codes, a testing program does not need to include all of the alternate test codes. Rather, the testing program for a particular embodiment of computing system 10 only needs to include the test codes for the specific elements and their selected product configurations in order to test integration of that embodiment. The testing program is then executed to test integration of computing system 10. Execution of the testing program can occur on one or more elements in computing system 10 and/or testing system 11, either simultaneously in parallel or sequentially. For example, portions of the testing program (preferably corresponding to distinct test codes) can be executed on both compute platform 12 and testing system 11 at the same time. Alternately, one portion of the testing program is first executed on compute platform 12 and, afterwards, another portion is then executed on testing system 11. As yet another example, all portions of the testing program can be executed sequentially on testing system 11. In this manner, computing system 10 using testing system 11 can support and verify the integration of a variety of hardware and software configurations.

With further reference to FIG. 1, other elements can be added to an integrated computing system 10, such as hub 112. Preferably, the additional element performs a specific function which is not already being performed by any element in the existing computing system 10. The additional element couples to one or more elements in computing system 10 at one or more integration points. For example, hub 112 might couple to application toolset 20 and network interface 22 of computing system 10 at integration points 122 and 124, respectively. Hub 112 may be implemented using a hub product supplied by Optical Data Systems, Inc. (112*a*), or any other suitable hub product.

One or more testing tables can be associated with the additional element, such as testing tables 114 and 116. Each testing table comprises a test procedure and one or more test codes corresponding to the alternate product configurations for the additional element. For example, testing table 114 includes test procedure 118 and test code 118*a* to test integration of hub 112 and application toolset 20 at integration point 122.

In operation, the testing tables for the additional element are retrieved. Next, the test codes corresponding to the particular product configuration used to implement the additional element are retrieved from the testing tables. For each particular product configuration used to implement an element in computing system 10, the corresponding test codes are retrieved from the testing tables associated with that element. The retrieved test codes for both the additional element and the elements in the existing computing system 10 are combined into a testing program. As stated above, portions of the testing program preferably can be executed either simultaneously in parallel or sequentially on one or more elements in computing system 10 and/or testing system 11. Consequently, the testing program can then be reexecuted to test integration of the additional element with computing system 10. Alternatively, integration testing may be performed by executing appropriate test codes for the integration points associated with the additional element alone. This allows modular addition of elements to computing system 10 without re-testing existing integrated elements.

Figure 2:
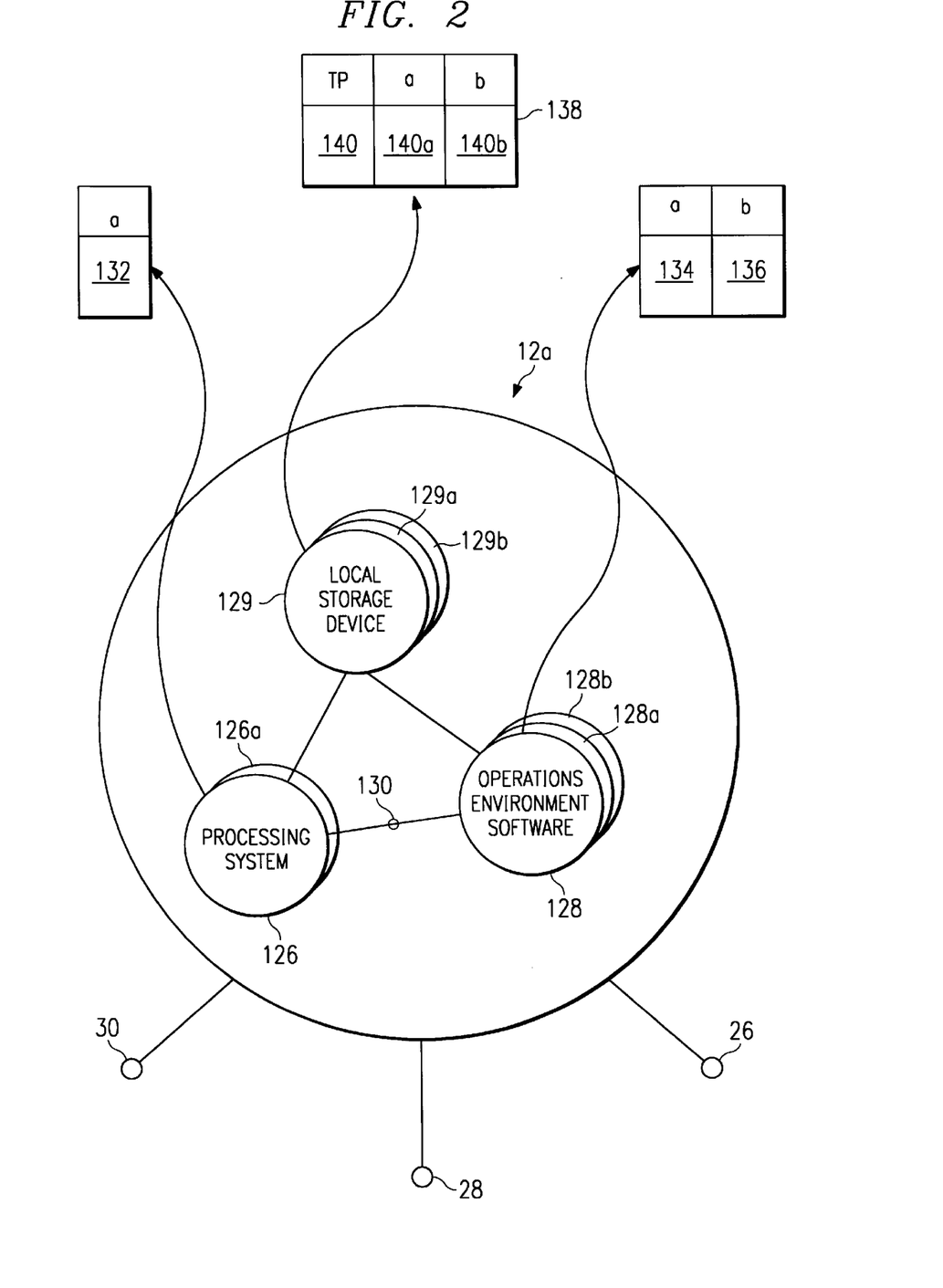
FIG. 2 illustrates an exemplary product configuration for one of the elements shown in FIG. 1.

FIG. 2 illustrates an exemplary product configuration, the SPARCServer/Solaris configuration 12*a*, for compute platform 12 shown in FIG. 1. As stated before, each element may be implemented as one or more alternate product configurations. If appropriate, each product configuration may contain one or more sub-elements, each of which serves a specific function in the product configuration. Consequently, a sub-element can be implemented as one or more generally available products operable to perform the function of the sub-element.

For example, configuration 12*a* may comprise the following sub-elements: a processing system 126 operable to process and manipulate data in SPARCServer/Solaris configuration 12*a*, an operations environment software 128 operable to direct or command processing system 126, a local storage device 129 operable to store data received by and generated within configuration 12*a*, and any other sub-element necessary to perform the function of compute platform 12. Processing system 126 can be implemented as a SPARCServer system 126*a*. Operations environment software 128 can be implemented as a Solaris 2.4 software 128*a* or Solaris 2.5 software 128*b*. If a product configuration comprises more than one sub-element, the sub-elements can interface at one or more integration points. Thus, for example, with further reference to FIG. 2, processing system 126 interfaces with operations environment software 128 at an integration point 130.

Like integration points between distinct elements in computing system 10, the integration points between sub-elements within a product configuration can be tested to ensure the integration of the sub-elements. In one embodiment, each alternate product can be associated with one or more test codes. For example, SPARCServer system 126a, Solaris 2.4 software 128a, and Solaris 2.5 software 128b can be associated with test codes 132, 134, and 136, respectively. The test codes for each product in a product configuration may be combined to form the test code for that particular product configuration.

For example, test code 54a (FIG. 1) for SPARCServer/Solaris configuration 12a may comprise test codes 132 and 134 for, respectively, SPARCServer system 126a and Solaris 2.4 software 128a. Alternatively, each sub-element can be associated with one or more testing tables which are similar to the testing tables described above with reference to FIG. 1. In particular, sub-element testing table 138 may comprise a test procedure 140 and one or more test codes 140a and 140b corresponding to each alternate product for local storage device 129. The testing tables allow a hierarchical arrangement between elements and sub-elements in the integration test environment of computing system 10.

FIGS. 3-6 illustrate flow charts for various methods by which testing system 11 generates the testing tables described above and then executes code within the testing tables to test the integration of all elements in computing system 10. These methods may be implemented as one or more software programs on testing system 11 that reside separate from or integral to one or more elements of computing system 10. During the steps of these methods, a user of testing system 11 may communicate with the testing system through a workstation, terminal, and/or any other interface device.

Figure 3:
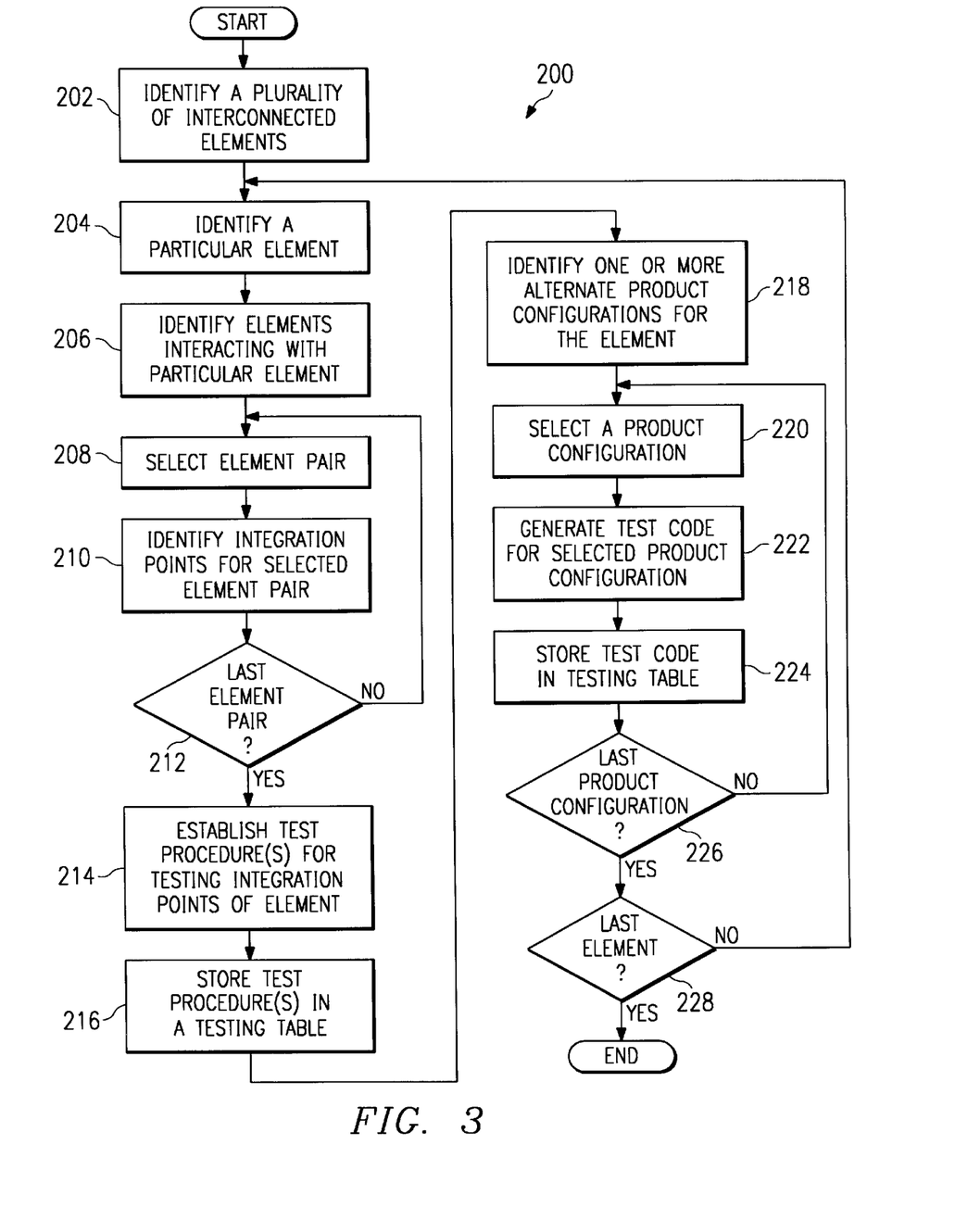
FIG. 3 illustrates a flow chart of a method for generating one or more test codes to test the integration of elements in a computing system.

FIG. 3 illustrates a flow chart of a method 200 by which testing system 11 generates the testing tables shown in FIG. 1. The method begins at step 202 where testing system 11 identifies the plurality of interconnected software and hardware elements that may be part of computing system 10. These elements, which include compute platform 12, disk storage device 14, systems management 16, performance monitor 18, application toolset 20, network interface 22, and database 24, according to the example of computing system 10 illustrated in FIG. 1, perform specific functions in computing system 10.

Testing system 11 identifies a particular element at step 204 and identifies the elements interacting with the particular element at step 206. Thus, for example, testing system 11 may identify compute platform 12 and determine that disk storage device 14, database 24, and network interface 22 interface with compute platform 12. Testing system 11 selects an element pair, which comprises the particular element and one other element with which it interacts at step 208. Accordingly, compute platform 12 and disk storage device 14 may be selected as an element pair.

Testing system 11 identifies integration points, such as integration point 26, for the selected element pair at step 210. Each integration point may be defined as any communication, in one or more hardware or software layers, between elements in the element pair. In one embodiment, testing system 11 automatically identifies the integration points. In another embodiment testing system 11 may prompt a user to identify the integration points and input the identified integration points into testing system 11. The integration points in computing system 10 can be identified based on the functions provided by the elements in computing system 10, the product configurations, the products in each product configuration, the interfaces available on a product, and/or a product's use in computing system 10.

Testing system 11 determines whether the current element pair is the last element pair that can be selected from the particular element and all elements with which it interfaces at step 212. If the current element pair is not the last element pair, testing system 11 returns to step 208 where another element pair is selected. Testing system 11 repeats steps 208–212 until all integration points between the particular element and each element with which it interfaces have been identified. Accordingly, integration points 26, 28, and 30 are generated for the interfaces between compute platform 12 and disk storage device 14, database 24, and network interface 22, respectively.

One or more test procedures for testing all of the integration points of the particular element are established at step 214. The test procedures may be steps, commands, pseudocode, or any format of information that defines, outlines, or represents a test for the commands, functions, transfers, and other activities between the particular element and at least one other element in computing system 10. Referring to the example of compute platform 12, these test procedures are test procedures 54, 56, and 58 in testing tables 48, 50, and 52, respectively.

In one embodiment, a user may develop the test procedures according to the identified integration points, and input the developed test procedures into testing system 11. Each test procedure is stored in a corresponding testing table, such as testing tables 48, 50, and 52 associated with compute platform 12, at step 216. At this point, testing system 11 has identified the functional interoperability between all elements in computing system 10 and established generic test procedures for testing integration of the functional elements.

To generate specific test codes for specific products, one or more alternate product configurations for the particular element are identified at step 218. These product configurations may comprise one or more commercially available products capable of performing the specific function of the element. For example, compute platform 12 may be implemented as the SPARCServer/Solaris configuration 12a, the HP-9000/HP-UX configuration 12b, the SYMMETRY 5000/DYNIX/ptx configuration 12c, or any other suitable computing platform product.

Testing system 11 selects one product configuration, such as the SPARCServer/Solaris configuration 12a at step 220. A test code (e.g., test code 54a) is generated for the selected product configuration at step 222. Each test code follows the test procedure previously established for testing the integration points of the particular element. For example, test code 54a corresponds to test procedure 54. The test codes comprise commands, procedures, or other information properly formatted for a corresponding product configuration to test integration of the configuration in computing system 10. In one embodiment, testing system 11 may prompt a user to develop and/or input a test code into testing system 11. Because each test procedure may comprise steps, commands, or pseudocode that define or outline a generic integration test for the element, the user can readily develop or assemble a specific test code for a particular product configuration by following the steps/commands/pseudocode of the associated test procedure. In particular, testing system 11 may sequentially display each step in a test procedure to a user so that the user can develop and/or input corresponding lines or steps of test code. For example, in response to the display of a test procedure step which recites "save," a user may input a specific line of test code such as "SAVE__ D1," which is a compatible command for the selected product configuration.

Testing system 11 stores the generated test code for a particular product configuration in a corresponding testing table at step 224. For example, test code 54*a* is stored in table 48. At step 226, testing system 11 determines whether the current product configuration is the last product configuration for the particular element. If not, testing system 11 returns to step 220 where it selects another product configuration. Testing system 11 repeats steps 220–226 until a test code for each alternate product configuration has been generated and stored in an appropriate testing table for each test procedure. Thus, system 11 generates test codes 54*a*, 54*b*, 54*c* corresponding to test procedure 54 for product configurations 12*a*, 12*b*, and 12*c*, respectively; test codes 56*a*, 56*b*, and 56*c* corresponding to test procedure 56 for product configurations 12*a*, 12*b*, and 12*c*, respectively; and test codes 58*a*, 58*b*, and 58*c* corresponding to test procedure 58 for product configurations 12*a*, 12*b*, and 12*c*, respectively.

Testing system 11 determines whether the current element is the last element at step 228. If not, testing system 11 returns to step 204 where another element is identified. Testing system 11 repeats steps 204–228 to generate test codes for each product configuration of each element in computing system 10.

Figure 4:
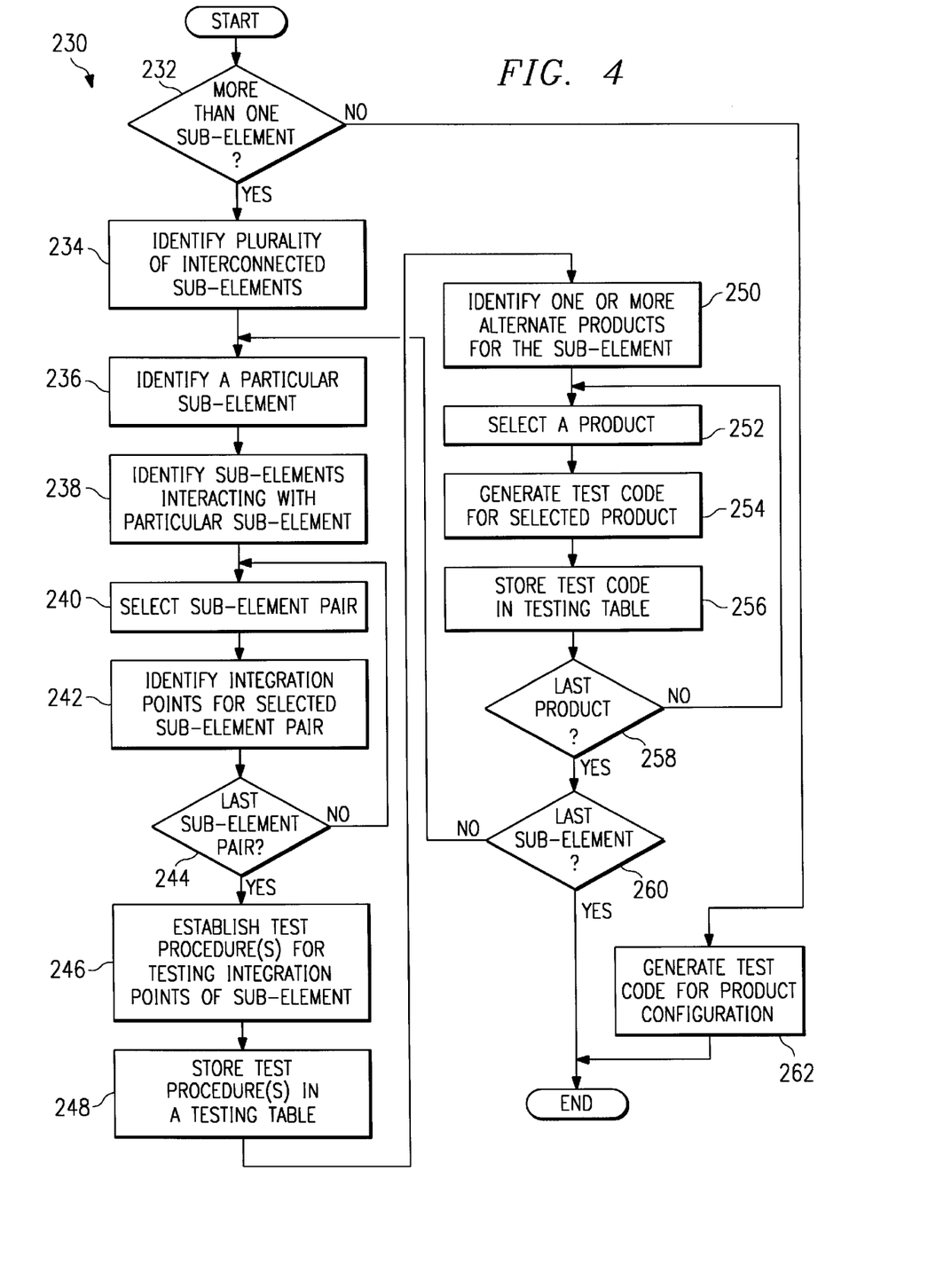
FIG. 4 illustrates a flow chart of a method for generating a test code for a particular product configuration.

FIG. 4 is a flow chart for a method 230, corresponding to step 222 shown in FIG. 3, by which testing system 11 generates a test code for a particular product configuration, such as SPARCServer/Solaris configuration 12*a*. Method 230 may be implemented as a subroutine of method 200 shown in FIG. 3.

Method 230 begins at step 232, where testing system 11 determines whether the product configuration consists of more than one sub-element. If not, a test code for the product configuration is generated at step 262, for example, by the process described above wherein testing system 11 prompts a user to input a suitable portion of test code in response to the display of a generic step in a test procedure.

Otherwise, if the product configuration includes more than one sub-element, then the plurality of sub-elements in the configuration are identified at step 234. For example, processing system 126 and operations environment software 128 can be identified in the SPARCServer/Solaris configuration 12*a*. Steps 236–260 correspond to steps 204–228 in FIG. 3 to generate test code for each identified sub-element. Thus, with reference to the example of the SPARCServer/Solaris configuration 12*a*, testing system 11 may establish test table 138 for local storage device 129 in FIG. 2. If a testing procedure is not needed, steps 246 and 248 may be omitted to establish, for example, test codes 132, 134, and 136.

After testing system 11 generates test codes according to methods 200 and 230 described with reference to FIGS. 3 and 4, an operational computing system can be readily implemented as an embodiment of computing system 10. Different embodiments of computing system 10 may contain all, or only a portion, of the elements shown in FIG. 1. In one embodiment, computing system 10 may consist of compute platform 12, disk storage device 14, systems management 16, application toolset 20, and database 24. Another embodiment of computing system 10 may include compute platform 12, systems management 16, database 24, and network interface 22. The functional elements in a particular embodiment of computing system 10 may be determined by the specific requirements and functions performed.

Furthermore, each element in a particular embodiment of computing system 10 may include one of the alternate product configurations. In one embodiment of computing system 10, an Ethernet NIC configuration 22*a* may be used for network interface 22, whereas, in another embodiment, an FDDI NIC configuration 22*b* can be used. Again, a variety of reasons may determine the choice of product configurations in any specific embodiment of computing system 10. Integration of each product of each element in the chosen embodiment is tested by testing system 11 using the established test codes.

Figure 5:
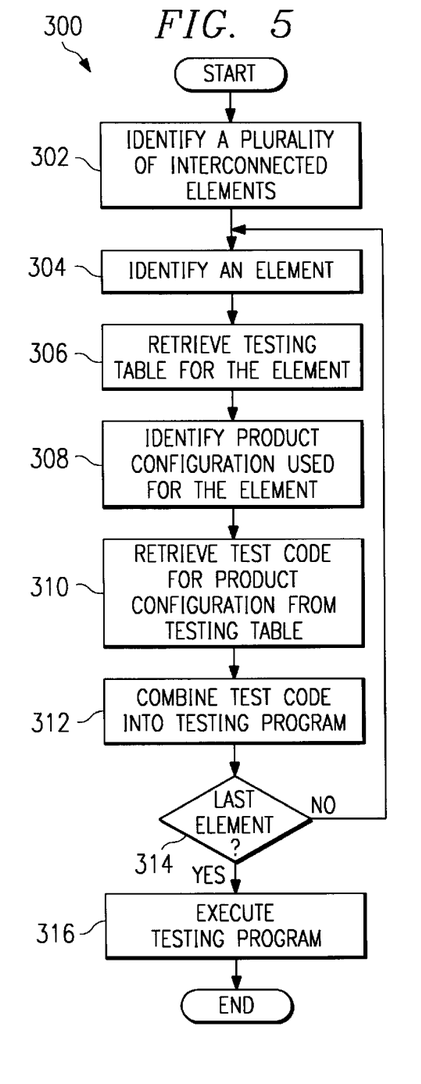
FIG. 5 illustrates a flow chart of a method for testing the integration of elements in a computing system using the generated test codes.

FIG. 5 is a flow chart of a method 300 by which testing system 11, using the previously generated test codes, tests the integration of all interconnected elements forming an embodiment of computing system 10. Method 300 begins at step 302, where testing system 11 identifies a plurality of interconnected elements in the particular embodiment of computing system 10. Testing system 11 identifies a particular element, such as network interface 22, in the computing system 10 at step 304. One or more testing tables corresponding to the particular element are retrieved at step 306. Testing system 11 may retrieve testing tables 100, 102, and 104 for network interface 22.

Testing system 11 identifies the specific product configuration used for the particular element at step 308. Accordingly, Ethernet NIC configuration 22*a* may be identified as the product configuration for network interface 22. The test code or codes corresponding to the specific product configuration are retrieved from the testing tables associated with the particular element at step 310. Therefore, testing system 11 may retrieve test codes 106*a*, 108*a*, and 110*a* corresponding to Ethernet NIC configuration 22*a* from testing tables 100, 102, and 104, respectively. In one embodiment, testing system 11 combines the retrieved codes into a testing program at step 312. Alternatively, testing system 11 may establish indexes, pointers, or other information that relates retrieved test codes to a specific integration testing.

Testing system 11 determines whether the current element is the last of the interconnected elements in the particular embodiment of computing system 10 at step 314. If not, testing system 11 returns to step 304 where another element is identified. Testing system 11 repeats steps 304–314 until the integration test code has been identified for the particular embodiment of computing system 10. The testing program contains or refers to at least one test code for each specific product configuration used to implement the embodiment. Testing system 11 executes the complete testing program to test integration of the interconnected elements in the embodiment of computing system 10 at step 316.

If an identified product configuration at step 308 includes a further functional description of sub-elements, then testing system 11 may retrieve the sub-element testing table, identify the product that performs the functions of the sub-element, and retrieve the appropriate test code from the sub-element testing table in the same manner as steps 306–310 described above. Therefore, testing system 11 utilizes the same hierarchial arrangement of testing tables for elements and sub-elements in computing system 10 to retrieve and execute integration test code.

Figure 6:
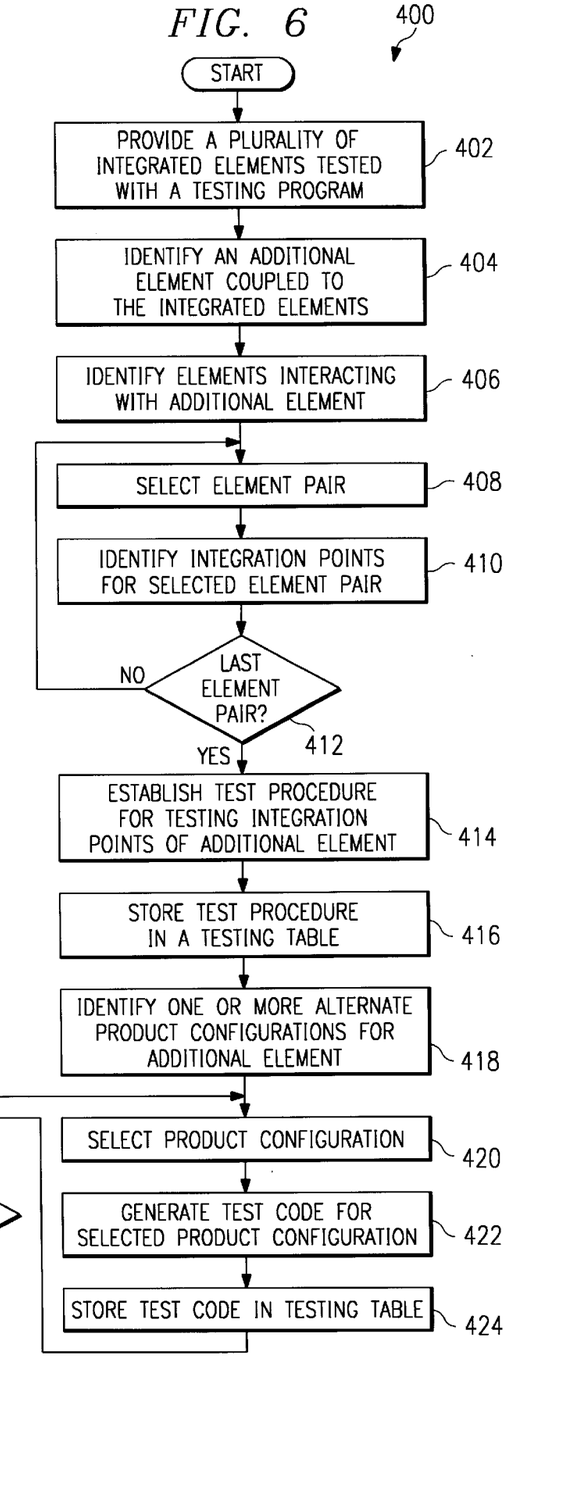
FIG. 6 illustrates a flow chart of a method for generating a test code to test the integration of an element added to an integrated computing system.

FIG. 6 is a flow chart of a method 400 by which system 11 generates one or more test codes for an element, such as hub 112, added to the plurality of integrated elements in computing system 10. For purposes of this discussion, testing system 11 has already generated one or more first testing tables to test the interoperability of integrated elements in computing system 10. Method 400 illustrates additional steps to generate one or more second testing tables to test the interoperability of the additional element with the existing, integrated elements. Therefore, the first testing tables and second testing tables together contain the integration test code to test the interoperability of computing system 10 that includes the additional element.

Method 400 begins at step 402 wherein the integrated elements forming computing system 10 are provided. Testing system 11 identifies the additional element, such as hub 112, coupled to the integrated elements of computing system 10 at step 404. Preferably, the additional element performs a specific function which is not already being performed by any element in the existing computing system 10.

Testing system 11 identifies the elements in computing system 10 which interact with the additional element at step 406. For example, application toolset 20 and network interface 22 are identified as interfacing with hub 112. Testing system 11 selects an element pair consisting of the additional element and one of the elements with which it interfaces at step 408. For example, an element pair can be hub 112 and network interface 22. Testing system 11 identifies one or more integration points, such as integration point 124, for the selected element pair at step 410. In one embodiment, testing system 11 automatically identifies the integration points between the additional element and an element in existing computing system 10. In another embodiment, testing system 11 may prompt a user to identify the integration points and input the identified integration points into testing system 11.

Testing system 11 determines whether the current element pair is the last element pair that can be formed between the additional element and the elements with which it interfaces at step 412. If not, testing system 11 returns to step 408 where another element pair is selected. Accordingly, hub 112 and application toolset 20 are selected as the next element pair. Steps 408–412 are repeated until all integration points between the additional element and the integrated elements are identified. Accordingly, integration points 122 and 124 are identified for the interfaces between hub 112 and application toolset 20 and network interface 22, respectively.

One or more test procedures for testing the integration points between the additional element and the integrated elements are established at step 414. In one embodiment, a user can develop the test procedures according to the identified integration points between elements. The developed test procedures are input into testing system 11. With reference to the example of hub 112, these test procedures are test procedures 118 and 120. Each test procedure is stored in a corresponding testing table, such as testing tables 114 and 116, which are associated with the additional element at step 416.

One or more alternate product configurations for the additional element are identified at step 418. Each product configuration may consist of one or more generally available products which can be used, individually or in combination, to perform the function defining the additional element. For example, hub 112 can be implemented as an INFINITY system, manufactured by Optical Data Systems, Inc, and designated as configuration 112a. Furthermore, configuration 112a may comprise one or more sub-elements, each of which performs a specific function in configuration 112a. The products used to implement the sub-elements are also identified at this point.

Testing system 11 selects one product configuration, such as, for example, configuration 112a at step 420. A test code, such as test code 118a or 120a, for the selected product configuration is generated at step 422. Each test code corresponds to a test procedure previously established for testing the integration points of the additional element. Test codes 118a and 120a correspond to test procedures 118 and 120, respectively. In one embodiment, testing system 11 may prompt a user to develop and/or input test code by sequentially displaying steps and/or commands in the corresponding test procedure for the additional element. Step 422 is substantially similar to step 222 described in detail above with reference to FIG. 4.

Testing system 11 stores each test code for the particular product configuration in a corresponding testing table at step 424. For example, test codes 118a and 120a are stored in testing tables 114 and 116, respectively. Testing system 11 determines whether the current product configuration is the last product configuration for the additional element at step 426 and, if not, testing system 11 returns to step 420 where it selects another product configuration. Testing system 11 repeats steps 420–426 until a test code for each alternate product configuration of the additional element has been generated and stored in an appropriate testing table for each test procedure.

At this point, an embodiment of computing system 10 which includes the additional element can be implemented by selecting a particular product configuration for the additional element and testing for integration using the test codes established for the additional element. In one embodiment, method 300, described above with reference to FIG. 5, may be performed to generate another testing program which includes or refers to the test codes established for the additional element. The generated testing program is then executed to test the integration of computing system 10.

Because testing tables and test codes are preferably functionally defined and modular, new test codes for existing elements need not be generated and/or executed each time an element is added to computing system 10. Rather, a test code may be generated only for the additional element in order to test integration of the additional element with the entire computing system 10. Moreover, integration testing may be performed by executing test codes for the integration points associated with the additional element without re-testing existing, integrated elements of computing system 10. Consequently, redundant generation and execution of test code may be reduced or eliminated by the systematic and standardized scheme for defining integration between elements and sub-elements in computing system 10.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An automated method for testing integration of a plurality of elements in a computing system, comprising:

for each element, retrieving a testing table associated with the element, each testing table comprising a testing procedure representing an integration test for the associated element and a plurality of test codes, each test code corresponding to an alternate product configuration for the associated element;

identifying an alternate product configuration for each element;

retrieving from each testing table the test code corresponding to the identified alternate product configuration for the associated element;

combining the retrieved test codes into a testing program; and executing the testing program to test integration of the plurality of elements in the computing system.

2. The method of claim 1, further comprising:

identifying a sub-element in the identified alternate product configuration for each element; and retrieving a test code for each sub-element.

3. The method of claim 1, further comprising:

identifying at least one integration point between the plurality of elements; and establishing a testing procedure for each integration point.

4. A computing system, comprising:

a first element;

a second element coupled with the first element at an integration point;

a first testing table associated with the first element, the first testing table comprising a first testing procedure representing an integration test for the first element and a plurality of first test codes, each first test code corresponding to an alternate product configuration for the first element;

a second testing table associated with the second element, the second testing table comprising a second testing procedure representing an integration test for the second element and a plurality of second test codes, each second test code corresponding to an alternate product configuration for the second element; and each of the first test codes operable to be combined with each of the second test codes into a testing program which can be executed to test integration of the first element with the second element.

5. The system of claim 4, wherein each alternate product configuration for the first and second elements comprises a plurality of distinct products.

6. The system of claim 4, wherein:

the first element comprises a computer platform operable to process information; and the second element comprises a database operable to store information.

7. The system of claim 4, wherein each of the first element and the second element comprises a plurality of sub-elements.

8. The system of claim 4, wherein the integration point represents commands exchanged between the first element and the second element.

9. A computing system, comprising:

a plurality of elements coupled at one or more first integration points;

at least one first testing table for testing integration of the plurality of elements at the first integration points, the first testing table comprising a first testing procedure representing an integration test for the plurality of elements and a plurality of first test codes, each first test code corresponding to an alternate product configuration for the plurality of elements;

an additional element operable to couple to the plurality of elements at one or more second integration points;

at least one second testing table for testing integration of the additional element with the plurality of elements at the second integration points, the second testing table comprising a second testing procedure representing an integration test for the additional element and a plurality of second test codes, each test second test code corresponding to an alternate product configuration for the additional element; and each of the first test codes operable to be combined with each of the second test codes into a testing program which can be executed to test integration of the additional element with the plurality of elements.

10. The system of claim 9, wherein the plurality of elements comprises:

a computer platform operable to process information; and a database operable to store information.

* * * * *